B. D. WILLIS.
STABILISCOPE.
APPLICATION FILED JULY 31, 1916.
1,294,856.
Patented Feb. 18, 1919.
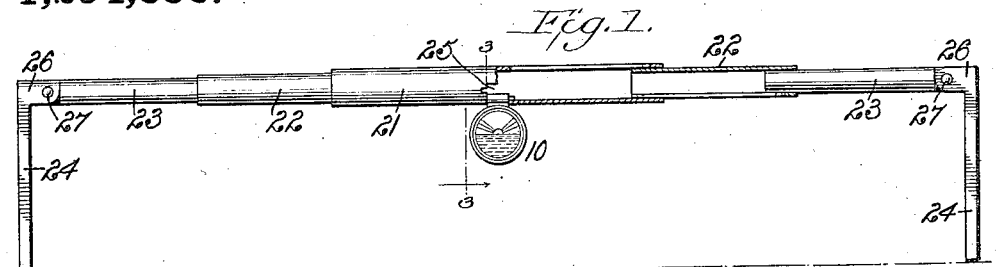
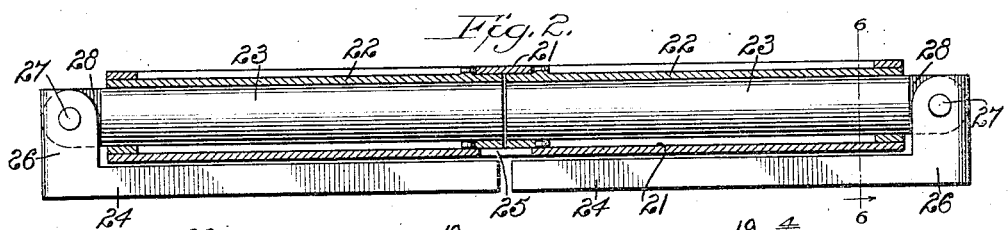
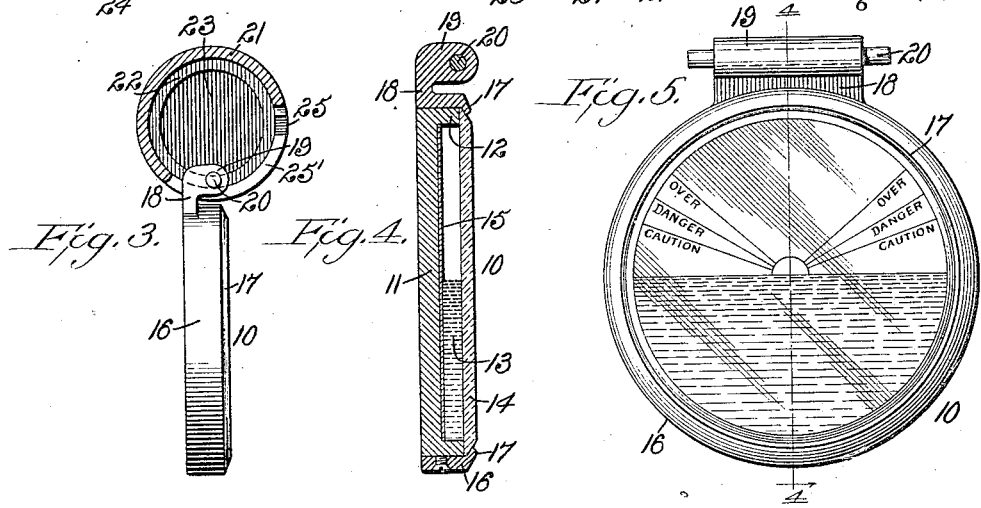
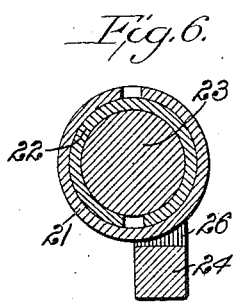
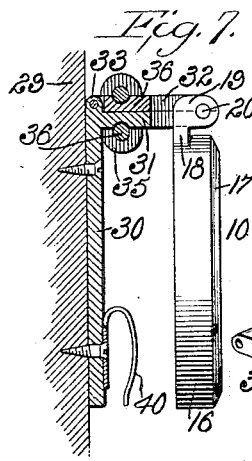
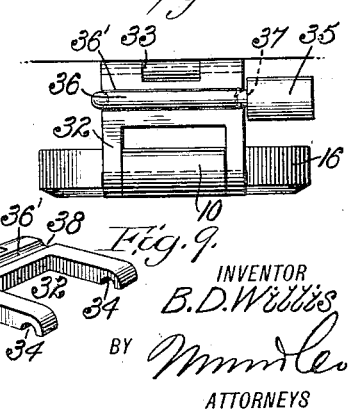
WITNESSES
INVENTOR
B. D. Willis
BY
ATTORNEYS

UNITED STATES PATENT OFFICE.

BERNARD DARWIN WILLIS, OF OAK PARK, ILLINOIS.

STABILISCOPE.

1,294,856.

Specification of Letters Patent.   Patented Feb. 18, 1919.

Application filed July 31, 1916.  Serial No. 112,303.

*To all whom it may concern:*

Be it known that I, BERNARD D. WILLIS, a citizen of the United States, and a resident of Oak Park, in the county of Cook and State of Illinois, have invented a new and Improved Stabiliscope, of which the following is a full, clear, and exact description.

This invention relates to safety appliances for use on or in connection with automobiles or other road vehicles for the purpose of determining or indicating to the driver or other occupant of the vehicle the condition of safety of the roadway or stability of the conveyance while passing along roadways of doubtful or precarious sidewise inclination.

Among the objects of the invention, therefore, is to provide a means whereby any occupant of the vehicle may be able to know at any time at a glance the condition of stability of the conveyance.

Another object of the invention is to provide a means whereby the condition of a precarious piece of roadway with respect to the stability of the conveyance to be driven thereover may be determined preliminary to driving to or over such spot.

Another object of the invention is to provide an instrument or set of instruments so calibrated with respect to the points of support and the height of the center of gravity of the vehicle on which or with which the instruments are to be used, that a condition of unstable equilibrium will be indicated visually without reference to any angular reading in degrees of the departure of the conveyance from the true horizontal.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a front elevation partly in section of a stabiliscope shown as applicable to a roadway for the purpose of determining beforehand the condition thereof as to the safety of a conveyance proposed to be driven thereover;

Fig. 2 is a longitudinal section of the frame portion of this device in folded or collapsed position;

Fig. 3 is a vertical transverse section on the line 3—3 of Fig. 1;

Fig. 4 is a vertical transverse section on the line 4—4 of Fig. 5;

Fig. 5 is a front elevation of the pivoted indicator;

Fig. 6 is a transverse sectional detail on the line 6—6 of Fig. 2;

Fig. 7 is a view similar in nature to Fig. 3, but showing the indicator suspended upon a bracket secured to the vehicle;

Fig. 8 is a plan view of the device shown in Fig. 7; and

Fig. 9 is a detail perspective view of the movable member of the bracket.

Referring now more particularly to the drawings, I show in one form or adaptation of the invention, an indicator 10 comprising a flat circular casing with a body or back 11 having a flange 12 forming a chamber for a suitable fluid 13, such as mercury, and retained in the chamber formed within the flange 12 by means of a face plate 14 of transparent material. The chamber, formed as above described, is provided in its back or bottom with a dial 15. The parts above described are held together in permanent fixed relation by means of a strong rim 16 having a lip 17 overlapping the edge of the face plate. The rim is provided with a rigid shank 18, the sides or edges of which are flat and parallel. The shank terminates at its upper end in a hub 19 through which a pivot pin 20 projects in a horizontal direction or perpendicular to the vertical axis of the shank.

As premised above, the indicating device described herein is not to be regarded as a meter which may be used indiscriminately on any conveyance for the purpose of measuring the angle of dip or grade, but rather as a safety device calibrated to indicate unsafe conditions of equilibrium for a particular conveyance. The dial 15 has upon its face indicating marks laid out preferably radially in such a manner that when the instrument is turned sidewise around its center, the surface or upper edge of the fluid will approach these markings on one or the other side of the center, the markings being duplicated on opposite sides of the vertical so as to accommodate the instrument to inclination in either direction. The calibration of the dial may be made in any suitable manner such as follows: After mounting the instrument securely in the vehicle or one of the same type upon which it is to be used, in a position to face the driver, the vehicle loaded will be secured from toppling over and then the platform upon which it stands will be tilted sidewise until the upper pair of wheels are relieved of pressure due to weight. The position of the fluid at the outer edge will then be marked for the "over" indication. At six degrees nearer the horizontal the "danger" line should be drawn, and a few degrees farther down the "caution" line. It will be understood that this operation will be performed at the factory for each type of vehicle or particular usage for which the device is intended. It will thus be seen that since the fluid in the indicator tends to maintain a horizontal position at its upper edge, the condition of safety of the vehicle will always be directly indicated to the driver or other occupant. The dial may be further graduated or calibrated to indicate the several conditions when the vehicle is empty or loaded in a predetermined manner.

The form of shank or suspending means for the indicator above referred to is important because of its correlation to the relatively stationary bracket or other supporting means to or upon which the indicator is connected, either permanently or temporarily. As indicated in Fig. 1, I provide a bracket of a telescopic or collapsible nature adapted to be folded into small compass and carried in the tool box or the like, and when about to pass a precarious piece of roadway or section, the frame is taken out and set up as indicated in Fig. 1 and the indicator or a duplicate indicator is suspended from the same. This frame comprises in the form shown a central section 21, intermediate tubular sections 23 and a pair of legs 24. The central tubular section 21 is provided with a longitudinal slot 25 through which the hub and pivot portions 19 and 20 of the indicator are adapted to be introduced bodily to the inside of said section when the frame is extended. This slot 25 is extended circumferentially of the section, as indicated at 25', to permit the shank 18 to move around toward the bottom of the section 21. The side edges of this slot extension are arranged in parallel planes, between which the plane edges of the shank 18 closely fit so as to prevent any tendency of the indicator to tilt relatively to the axis of the frame when the frame is applied to a road having considerable pitch or dip. It will be understood that the indicator is so supported upon the ends of the pivot pin 20 as to swing freely to and fro around the axis of the pivot, the ends of the pivot resting upon the bottom of the member 21. The sections 22 and 23 are arranged to telescope with respect to one another and the central section 21 is plainly shown in Figs. 1 and 2. The legs are provided with right angular knees 26 and are pivoted at 27 to the outer ends 28 of the members 23. The leg and end portions adjacent the pivots are provided with square shoulders to limit the outward swinging of the legs to positions perpendicular to the axis of the telescopic portion of the frame. The dimensions of the road bracket are such that when extended and set up, the legs are separated by the same distance as the tread of the machine. By this fact a more accurate determination of the condition of the roadway may be had since the legs of the bracket may occupy approximately the paths of the respective wheels. Furthermore, the bracket constitutes what may be regarded as a gage to indicate to the driver under certain conditions, where the wheels will operate and whether sufficient width of roadway is to be had for the passage of the machine. It will be understood that the indicator used in connection with the road device will be calibrated to correspond with the calibration of the indicator to be used or connected to the vehicle which carries the frame or road device, and consequently the operator will know by direct visual indication whether or not a certain precarious piece of roadway will permit the passage of his machine or vehicle.

In Figs. 7 and 8, I have shown the indicator pivotally attached to the vehicle, as shown at 29. The suspending means illustrated includes a bracket 30 secured rigidly to the vehicle frame or body and having a fixed jaw 31. A movable jaw 32 is hinged at 33 to the upper end of the bracket and is adapted to swing upwardly around the pivot to introduce the pivot pin 20 of the indicator into the bearing seats 34 between the jaws. The indicator supporting clamp effected by the parts 31 and 32 may be locked in any suitable manner as, for example, by means of a padlock 35 having a shackle 36, the parallel legs of which lie in grooves 36' formed in the upper and lower faces of the parts. The padlock also is preferably formed with a lug 37 which projects into an end seat 38 while the bend of the shackle fits into an end groove or seat 39 at the other side of the bracket, whereby all possibility of displacement of the lock is prevented. The indicator, however, is free to gravitate around the axis of the pivot 20 toward or from the bracket 30, so that it will always properly indicate the condition of danger or safety of the vehicle, irrespective of the dip of inclination of the vehicle forwardly or rearwardly. The impact of the indicator against the frame or bracket may be neutralized by a suitable spring 40.

I claim:

1. The herein described stabiliscope comprising an indicator and supporting means for the indicator, said indicator comprising a body having a circular cavity, a body of liquid half filling said cavity, a dial adjacent the body of liquid having calibrations to directly indicate the condition of stability of the vehicle with which the stabiliscope is to be used by virtue of the position of the liquid, and a rigid shank extending from the body having pivotal connection with the supporting means, the pivot for such connection being parallel with the plane of said dial.

2. In a stabiliscope, the combination of an indicator having a disk like body providing a cavity, a body of fluid half filling said cavity, a dial adjacent the body of liquid having right and left duplicate radial markings indicating various conditions of stability, a shank rigidly connected to the indicator body extending radially therefrom, the edges of the shank being flat and parallel, said shank terminating in a hub, a pivot pin projecting through the hub with its axis parallel with the plane of said dial, and a relatively stationary supporting means for the ends of the pivot pin serving to hold the pivot axis in a fixed position with respect to the supporting means but permitting free movement of the indicator around said axis.

3. The herein described stabiliscope indicator comprising a disk like body having a circular flange providing in the body a cavity, a face plate fitted over the edge of the flange, a dial fitted in the bottom of the cavity and having radial calibrations formed thereon, a body of liquid half filling the cavity between the face plate and the dial, a rim securing the aforesaid parts together, and suspending means connected to the rim, said suspending means providing for the free pivotal movement of the indicator forwardly and rearwardly but preventing tilting of the same laterally with respect to the supporting means.

BERNARD DARWIN WILLIS.

Witnesses:
 EMIL JACOBSEN,
 JOHN WICKS.